US011822588B2

(12) United States Patent
Boxwell et al.

(10) Patent No.: US 11,822,588 B2
(45) Date of Patent: Nov. 21, 2023

(54) SUPPORTING PASSAGE RANKING IN QUESTION ANSWERING (QA) SYSTEM

(71) Applicant: International Business Machines Corporation, Armonk, NY (US)

(72) Inventors: Stephen A. Boxwell, Columbus, OH (US); Keith G. Frost, Delaware, OH (US); Stanley J. Vernier, Grove City, OH (US); Kyle M. Brake, Dublin, OH (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 705 days.

(21) Appl. No.: 16/169,259

(22) Filed: Oct. 24, 2018

(65) Prior Publication Data

US 2020/0134088 A1    Apr. 30, 2020

(51) Int. Cl.
*G06F 16/33* (2019.01)
*G06F 17/10* (2006.01)
*G06F 16/332* (2019.01)

(52) U.S. Cl.
CPC ...... *G06F 16/3344* (2019.01); *G06F 16/3329* (2019.01); *G06F 16/3334* (2019.01); *G06F 17/10* (2013.01)

(58) Field of Classification Search
CPC ............ G06F 16/3344; G06F 16/3329; G06F 16/3334; G06F 17/10; G06F 40/30; G06F 16/334; G06F 16/3331; G06F 16/33; G06F 16/30
See application file for complete search history.

(56) References Cited

U.S. PATENT DOCUMENTS

| 5,724,571 | A  | * | 3/1998  | Woods      | G06F 16/30  |
|-----------|----|---|---------|------------|-------------|
| 7,707,204 | B2 | * | 4/2010  | Li         | G06F 16/313 |
|           |    |   |         |            | 707/711     |
| 7,856,350 | B2 | * | 12/2010 | Zhou       | G06F 40/30  |
|           |    |   |         |            | 704/9       |
| 8,024,332 | B2 | * | 9/2011  | Cao        | G06F 16/338 |
|           |    |   |         |            | 707/728     |
| 8,117,227 | B2 | * | 2/2012  | Montangero | G06Q 30/02  |
|           |    |   |         |            | 707/769     |
| 8,156,097 | B2 |   | 4/2012  | Cao et al. |             |

(Continued)

*Primary Examiner* — Miranda Le
(74) *Attorney, Agent, or Firm* — Troutman Pepper Hamilton Sanders LLP

(57) ABSTRACT

Embodiments provide a computer implemented method for ranking supporting passages in a question answering (QA) system. The method includes the following steps: receiving an input question and a plurality of passages, wherein the plurality of passages are extracted from the document corpus by the QA system; identifying a plurality of candidate answer occurrences from the plurality of passages; assigning a plurality of first local features to each candidate answer occurrence; merging the plurality of candidate answer occurrences to generate a group of candidate answers; assigning a plurality of second local features and a plurality of nonlocal features to each candidate answer; ranking the group of candidate answers using a linear answer scoring model; and ranking the plurality of candidate answer occurrences using the linear answer scoring model.

16 Claims, 4 Drawing Sheets

(56) References Cited

U.S. PATENT DOCUMENTS

| | | | |
|---|---|---|---|
| 8,195,655 B2 * | 6/2012 | Agrawal | G06F 40/295 707/730 |
| 8,645,125 B2 * | 2/2014 | Liang | G06F 40/289 704/9 |
| 8,666,730 B2 * | 3/2014 | Todhunter | G06F 16/3329 704/9 |
| 8,666,983 B2 | 3/2014 | Brill et al. | |
| 9,009,134 B2 * | 4/2015 | Xu | G06F 16/951 707/708 |
| 9,317,586 B2 | 4/2016 | Chu-Carroll et al. | |
| 9,720,981 B1 | 8/2017 | Boguraev et al. | |
| 10,963,497 B1 * | 3/2021 | Tablan | G06F 16/3344 |
| 2003/0074353 A1 * | 4/2003 | Berkan | G06F 16/3344 |
| 2010/0057717 A1 * | 3/2010 | Kulkarni | G06F 16/951 706/12 |
| 2011/0125734 A1 | 5/2011 | Duboue et al. | |
| 2011/0191276 A1 * | 8/2011 | Cafarella | G06F 16/358 706/12 |
| 2012/0077178 A1 | 3/2012 | Bagchi et al. | |
| 2012/0301864 A1 | 11/2012 | Bagchi et al. | |
| 2013/0017524 A1 | 1/2013 | Barborak et al. | |
| 2013/0018652 A1 | 1/2013 | Ferrucci et al. | |
| 2013/0262501 A1 * | 10/2013 | Kuchmann-Beauger | G06F 16/9024 707/769 |
| 2013/0304730 A1 * | 11/2013 | Zhou | G06Q 30/02 707/723 |
| 2015/0026106 A1 * | 1/2015 | Oh | G06F 16/3329 706/12 |
| 2015/0286629 A1 * | 10/2015 | Abdel-Reheem | G06F 40/295 704/9 |
| 2016/0180217 A1 | 6/2016 | Boston et al. | |
| 2017/0300565 A1 * | 10/2017 | Calapodescu | G06F 16/278 |
| 2019/0007711 A1 * | 1/2019 | Geva | G10L 15/26 |

\* cited by examiner

SUPPORTING PASSAGE RANKING IN QUESTION ANSWERING (QA) SYSTEM

TECHNICAL FIELD

The present disclosure relates generally to a system, method, and computer program product that are used to identify relevance of supporting passages to a particular candidate answer (also called hypothesis), and rank the supporting passages in an order of the relevance in a Question Answering (QA) system.

BACKGROUND

Question answering (QA) is a computer science discipline within the fields of information retrieval and natural language processing (NLP), which is concerned with building systems that automatically answer questions posed by humans in a natural language. A QA implementation, usually a computer program, may construct its answers by querying a structured database of knowledge or information, usually a knowledge base. QA systems can also pull answers from an unstructured collection of natural language documents.

In a QA system, machine learning techniques are used to distinguish good answers from poor ones during an answer scoring step. Before the answer scoring step, similar or equivalent answers can be merged into one candidate answer to reduce redundancy, i.e., multiple occurrences of the similar or same candidate answer are combined to one candidate answer.

In the answer scoring step, context dependent scorers may assign scores (i.e., local features) that are unique to a single occurrence of a candidate answer in a passage, while other scores (i.e., nonlocal features) that are propagated through all occurrences of the same candidate answer (or different candidate answers). In other words, the local features are calculated entirely based on a single occurrence of a candidate answer, while the nonlocal features are calculated based on features (i.e., scores) from other occurrences of the same candidate answer, or even from other candidate answers. Because the nonlocal features also consider other occurrences of the same candidate answer or/and other candidate answers for the same question, the nonlocal features may thus interfere with the QA system's ability to effectively rank supporting passages which provide an evidence for each candidate answer.

Thus, there is a need to provide a ranking approach using only local features, so as to more effectively rank supporting passages.

SUMMARY

Embodiments provide a computer implemented method for ranking supporting passages in a question answering (QA) system, wherein the QA system is coupled to a document corpus, and the document corpus includes a plurality of documents related to a particular domain, the method comprising: receiving, by a processor coupled to one or more user devices, an input question and a plurality of passages, wherein the plurality of passages are extracted from the document corpus by the QA system; identifying, by the processor, a plurality of candidate answer occurrences from the plurality of passages; assigning, by the processor, a plurality of first local features to each candidate answer occurrence; merging, by the processor, the plurality of candidate answer occurrences to generate a group of candidate answers; assigning, by the processor, a plurality of second local features and a plurality of nonlocal features to each candidate answer; ranking, by the processor, the group of candidate answers using a linear answer scoring model; ranking, by the processor, the plurality of candidate answer occurrences using the linear answer scoring model; and presenting, by the processor, a ranked list of candidate answers and a ranked list of supporting passages for each candidate answer, in response to the input question, wherein the supporting passages correspond to the plurality of candidate answer occurrences.

Embodiments further provide a computer implemented method, wherein the plurality of first local features are assigned by a plurality of context dependent scorers, and each context dependent scorer assigns one first local feature to the each candidate answer occurrence.

Embodiments further provide a computer implemented method, wherein the plurality of second local features are assigned by the plurality of context dependent scorers, and each context dependent scorer assigns one second local feature to the each candidate answer; the plurality of nonlocal features are generated from the plurality of second local features.

Embodiments further provide a computer implemented method, further comprising: calculating a first final confidence score from the plurality of first local features for the each candidate answer occurrence; and calculating a second final confidence score from the plurality of second local features and the plurality of nonlocal features for the each candidate answer, wherein the group of candidate answers are ranked based on the second final confidence score, and the plurality of candidate answer occurrences are ranked based on the first final confidence score.

Embodiments further provide a computer implemented method, wherein an N-Best algorithm is used in ranking the plurality of candidate answer occurrences, wherein the ranked list of supporting passages include at least one supporting passage having the first final confidence score over a predetermined N-best cutoff value.

Embodiments further provide a computer implemented method, wherein the plurality of candidate answer occurrences are ranked in an order of relevance to a particular candidate answer.

Embodiments further provide a computer implemented method, wherein the particular candidate answer occurs more than once in one or more supporting passages.

Embodiments further provide a computer implemented method, wherein at least two different candidate answers occur in a particular supporting passage.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawing embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
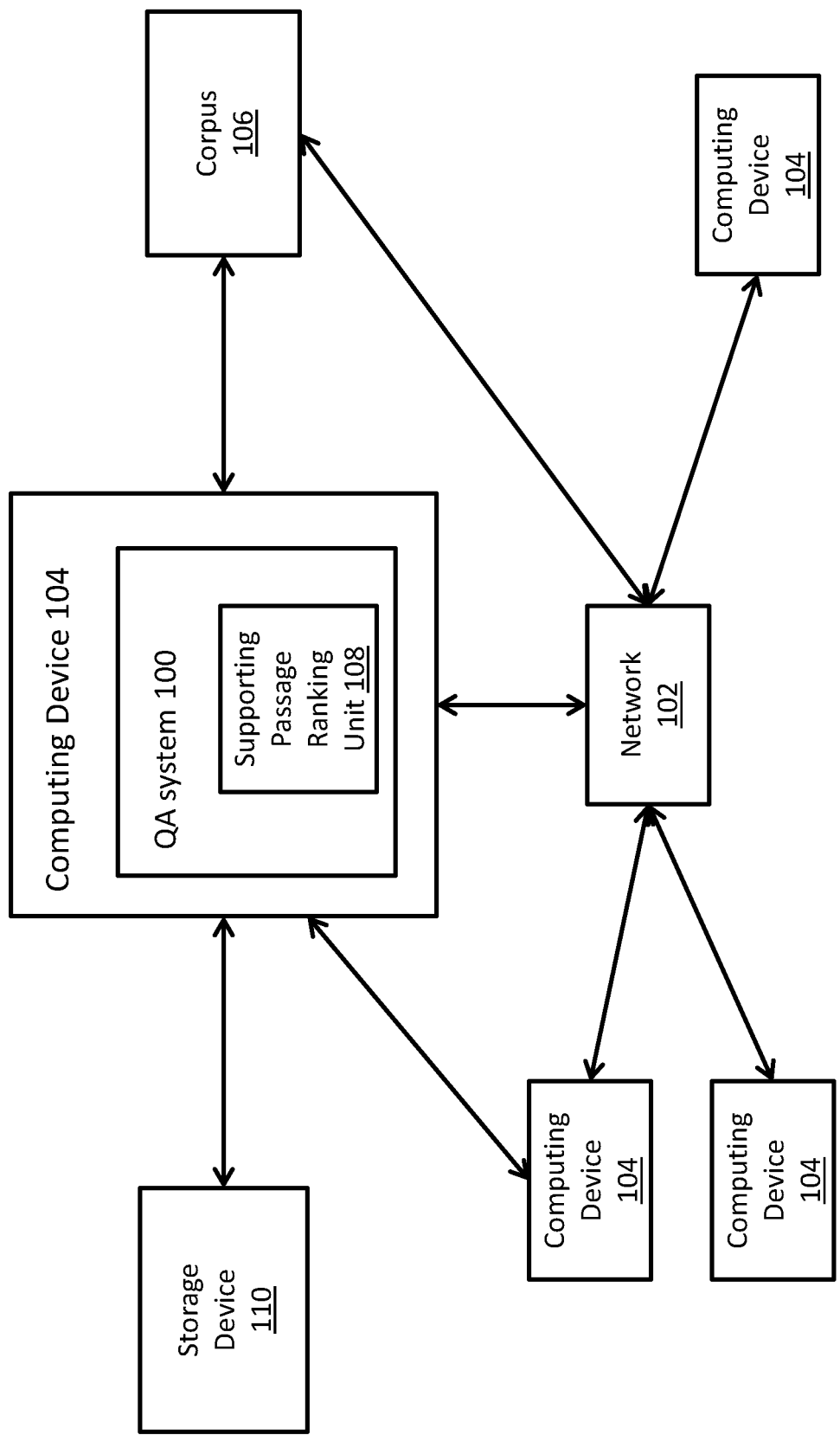
FIG. 1 depicts a schematic diagram of one illustrative embodiment of a question answering (QA) system implementing a supporting passage ranking unit.

Embodiments of the present invention may be a system, a method, and/or a computer program product. The computer program product may include a computer readable storage medium (or media) having computer readable program instructions thereon for causing a processor to carry out aspects of the present invention.

In an embodiment, a system, method, and computer program product for identifying relevance of supporting passages to a particular candidate answer, and ranking the supporting passages in an order of the relevance, are disclosed. With the system, method, and computer program product, an additional answer scoring step considering only local features is provided before a merging step. Because the local features are unique to each occurrence of a particular candidate answer (i.e., a different group of local features are assigned to each occurrence of a particular candidate answer), the relevance of the supporting passages (where a particular candidate answer occurs) to each candidate answer can be obtained based on different groups of local features. Accordingly, a list of supporting passages ranked in an order of relevance is obtained and presented to a user of the QA system.

In an example, a user of the QA system raises a question "which president signed the Affordable Care Act (ACA)?" The correct answer to this question is "Barack Obama." In this example, there are three passages containing the candidate answer "Barack Obama" in the QA system. In the first supporting passage "Barack Obama signed the ACA on Mar. 23, 2010, and then, Barack Obama went out for lunch with Joe Biden," there are two candidate answers "Barack Obama" and "Joe Biden," and "Barack Obama" occurs twice (i.e., there are two occurrences of the candidate answer "Barack Obama"). In the second supporting passage "Barack Obama, when approached by a fan, signed his autograph hastily and smiled," there is only one occurrence of the candidate answer "Barack Obama." In the third supporting passage "[s]everal world leaders met with Barack Obama during the UN Summit," there is also only one occurrence of the candidate answer "Barack Obama." Even though the correct answer "Barack Obama" appears in all the three supporting passages, only the first supporting passage actually answers the question. Ideally, the QA system should present the correct answer "Barack Obama," together with the first supporting passage (or a list of supporting passages, with the first supporting passage at the top of the list) to the user. If the QA system returns the correct answer "Barack Obama," together with the third supporting passage (or a list of supporting passages, with the third supporting passage at the top of the list) to the user, it might lead the user to erroneously determine that the returned answer is wrong because the third supporting passage is irrelevant to the raised question.

Before the four occurrences of the candidate answer "Barack Obama" are merged, context dependent scorers can calculate a first group of scores (i.e., a first group of local features) for each occurrence of the candidate answer. There are a plurality of context dependent scorers in the QA system, for example, a skip-n-gram scorer, a textual-alignment scorer, a bag-of-words scorer, a syntactic feature scorer, a semantic feature scorer, a logical form answer candidate scorer, a logical form pattern matcher answer scorer, a lexical string edit distance scorer, a character string edit distance scorer, etc. Each context dependent scorer assigns a local feature for each occurrence of the candidate answer "Barack Obama," and thus each occurrence of the candidate answer "Barack Obama" has a group of local features. Four groups of scores (i.e., four groups of local features) are calculated for four occurrences of "Barack Obama" in the three supporting passages, respectively, wherein two groups of scores are provided for two occurrences of "Barack Obama" in the first supporting passage, one group of scores are provided for one occurrence of "Barack Obama" in the second supporting passage, and one group of scores are provided for one occurrence of "Barack Obama" in the third supporting passage.

After the four occurrences of the candidate answer "Barack Obama" are merged, both context dependent scorers and context independent scorers can calculate a second group of scores (including local features and nonlocal features) for each candidate answer.

There are various ways of generating such first group of scores and second group of scores, depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

A linear answer scoring model is then used to calculate a final confidence score for each candidate answer, for example "Barack Obama," "Joe Biden," and rank all the candidate answers and get a ranked list with the correct answer "Barack Obama" at the top of the list. One example of the answer scoring model which may be used in conjunction with the principles described herein is described in U.S. Patent Application Publication No. US20110125734A1, which is herein incorporated by reference in its entirety.

Next, the linear answer scoring model is used to calculate a final confidence score for each occurrence of the candidate answer, for example each occurrence of "Barack Obama," and rank all the occurrences of the candidate answer "Barack Obama." Specifically, this step involves applying a weight (coefficient) to each local feature in the first group of local features, and summing all the weighed local features. The weights have been determined through training of the linear answer scoring model employed by the QA system, and can be dynamically updated. For example, the weights for scores that identify exactly matching terms and synonyms may be set relatively higher than the weights for scores which are evaluating publication dates for supporting passages. The weights themselves may be specified by subject matter experts or learned through machine learning processes that evaluate the significance of characteristics of supporting passages and their relative importance to overall candidate answer generation. The final confidence score summarizes the level of confidence that the QA system has about the evidence that a particular occurrence of candidate answer is inferred by the input question, i.e., that the particular occurrence of candidate answer is the correct answer for the input question. All the occurrences of the each candidate answer are ranked to obtain a ranked list with the most relevant occurrence of each candidate answer at the top of the list. In other words, all the supporting passages where "Barack Obama" occurs are ranked based on the final confidence score of each supporting passage, and a ranked list with the most relevant supporting passage at the top of the list. Similarly, other candidate answers, for example, "Joe Biden," are also each provided with a ranked list of supporting passages. In an embodiment, a subset of occurrences are chosen from all the occurrences of each candidate answer, and this subset of occurrences of each candidate answer are presented to the user or used for downstream processing. In an embodiment, the subset of occurrences of each candidate answer can be chosen using an N-best, Beta-best, or any other method of choosing a subset of results. The N-Best list or Beta-best is a well-known approach where a list of results are filtered based on the relative confidence value of each result compared to the best result. Specifically, a predetermined N-best or beta-best cutoff, for example 50%, is provided. Each result is assigned with a relative confidence value indicating the relevance of each result to the best result, and only the results over the cutoff (e.g., 50%) are obtained and put into the ranked list. With the N-Best or Beta-best algorithm, a narrower ranked list of supporting passages is generated, with the relative confidence value of each supporting passage in the ranked list over the cutoff (e.g., 50%). Accordingly, a ranked list having more relevant support passages is generated and presented to the user of the QA system.

FIG. 1 depicts a schematic diagram of one illustrative embodiment of a QA system 100 including a supporting passage ranking unit 108. The QA system 100 is implemented on one or more computing devices 104 (comprising one or more processors and one or more memories, and potentially any other computing device elements generally known in the art including buses, storage devices, communication interfaces, and the like) connected to the computer network 102. A plurality of computing devices 104 communicate with each other through the computer network 102. The computer network 102 can be one or more wired and/or wireless data communication links, where each communication link comprises one or more of wires, routers, switches, transmitters, receivers, or the like. The QA system 100 and computer network 102 enable question/answer (QA) generation functionality for one or more QA system users via their respective computing devices 104.

The QA system 100 is configured to receive inputs from various sources. For example, the QA system 100 receives inputs from the computer network 102, a corpus of electronic documents 106, QA system users, and/or other data and other possible sources of input. In one embodiment, some or all of the inputs to the QA system 100 are routed through the computer network 102. The various computing devices 104 include access points for content creators and QA system users. Some of the computing devices 104 include devices for a database storing the corpus of data 106. The computer network 102 includes local network connections and remote connections in various embodiments, such that the QA system 100 may operate in environments of any size, including local and global, e.g., the Internet.

In one embodiment, the content creator creates content in a document of the corpus of data 106. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user containing one or more answers to the question. In one embodiment, the QA system 100 provides a response to users in a ranked list of candidate answers. In a further embodiment, the QA system 100 provides a single final answer, or a ranked list of supporting passages for this single final answer. In a further embodiment, the QA system 100 provides a single final answer, together with a supporting passage for this single final answer. In another embodiment, the QA system 100 provides a ranked list of candidate answers, together with a ranked list of supporting passages for each candidate answer.

In some illustrative embodiments, the QA system 100 may be implemented on a cognitive system, for example IBM Watson™ cognitive system available from International Business Machines Corporation. The QA system 100 of the IBM Watson™ cognitive system receives an input question, it then parses the input question to extract the major features of the question, which are then used to formulate queries that are applied to the corpus of data. Based on the application of the queries to the corpus of data, a set of hypotheses, or candidate answers to the input question, are generated by looking across the corpus 106 to retrieve passages in documents of the corpus 106, potentially including a valuable response to the input question. The QA system of the IBM Watson™ cognitive system then performs deep analysis on the language of the input question and the language used in each of the passages found during the application of the queries using a variety of reasoning algorithms (also called scorers, including context dependent scorers and context independent scorers). The scores (also called features, including local features and nonlocal features) obtained from the various reasoning algorithms are then weighted against a statistical model (also called answer scoring model) that summarizes a level of confidence that the QA system of the IBM Watson™ cognitive system has regarding the evidence that a potential response, i.e., a candidate answer, is inferred by the question. This process is repeated for each of the candidate answers, to generate a ranked list of candidate answers which may then be presented to the user who submits the input question, or from which a final answer is selected and presented to the user.

In an embodiment, results from the corpus 106 are stored in storage device 110 associated with the QA system 100. The storage device 110 may be a memory, a hard disk based storage device, flash memory, solid state storage device, or the like.

Figure 2:
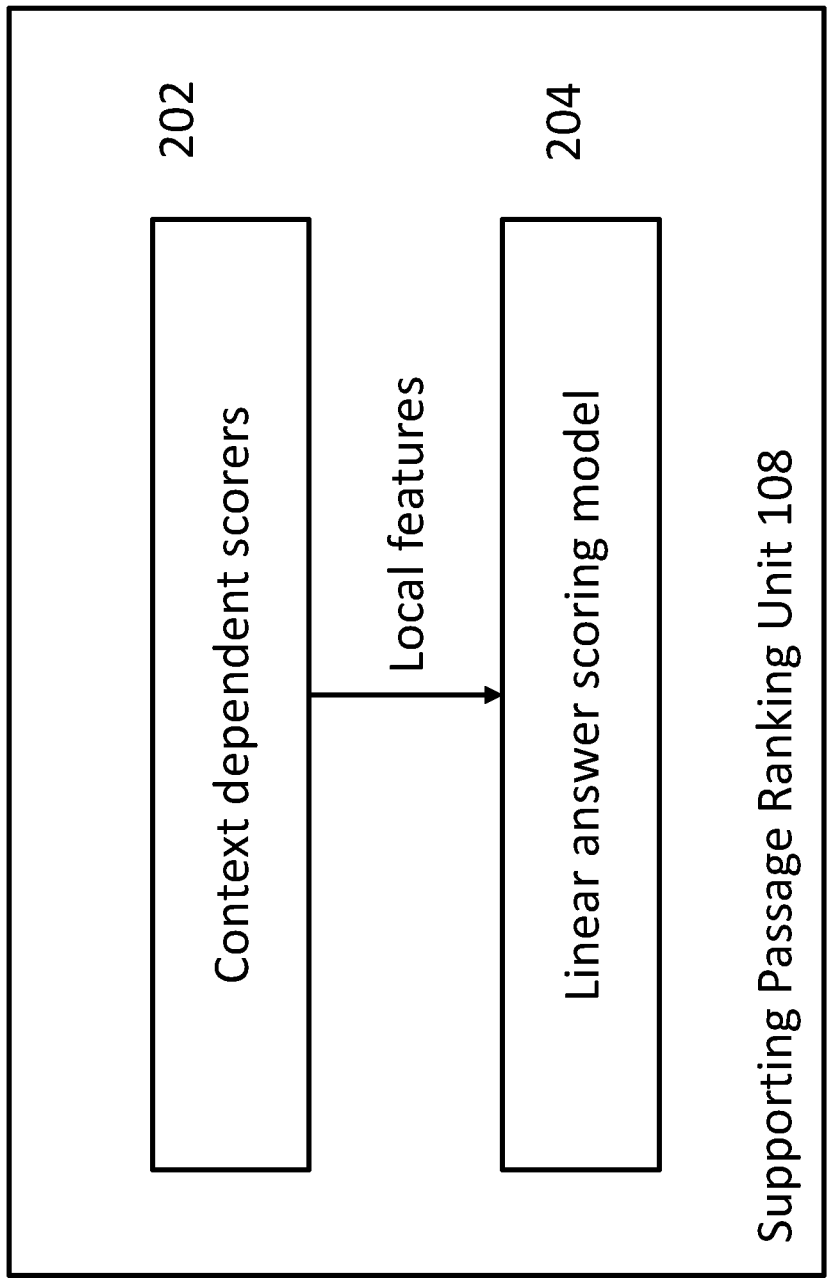
FIG. 2 is a block diagram of the supporting passage ranking unit, according to some embodiments described herein.

As shown in FIG. 1, in accordance with some illustrative embodiments, the QA system 100 is further augmented, in accordance with mechanisms of the illustrative embodiments, to include logic implemented in specialized hardware, software executed on hardware, or any combination of specialized hardware and software executed on hardware, for implementing a supporting passage ranking unit 108. The supporting passage ranking unit 108 is configured to obtain a supporting passage most relevant to a corresponding candidate answer, or a ranked list of supporting passages ranked according to the relevance to the corresponding candidate answer. Referring to FIG. 2, the supporting passage ranking unit 108 includes context dependent scorers 202 and linear answer scoring model 204. The context dependent scorers 202 and the linear answer scoring model 204 are existing components of the QA system, and the supporting passage ranking unit 108 utilizes the two components to rank supporting passages where a particular candidate answer occurs based on only local features. In an embodiment, the context dependent scorers 202 take into account contexts of a raised question and corresponding candidate answers, and assign scores (i.e., local features) that are unique to a single occurrence of a candidate answer in a supporting passage. The linear answer scoring model 204 assigns a weight to each local feature (i.e., multiplying a weight by a corresponding local feature), and sums all the weighted local features.

Figure 3:
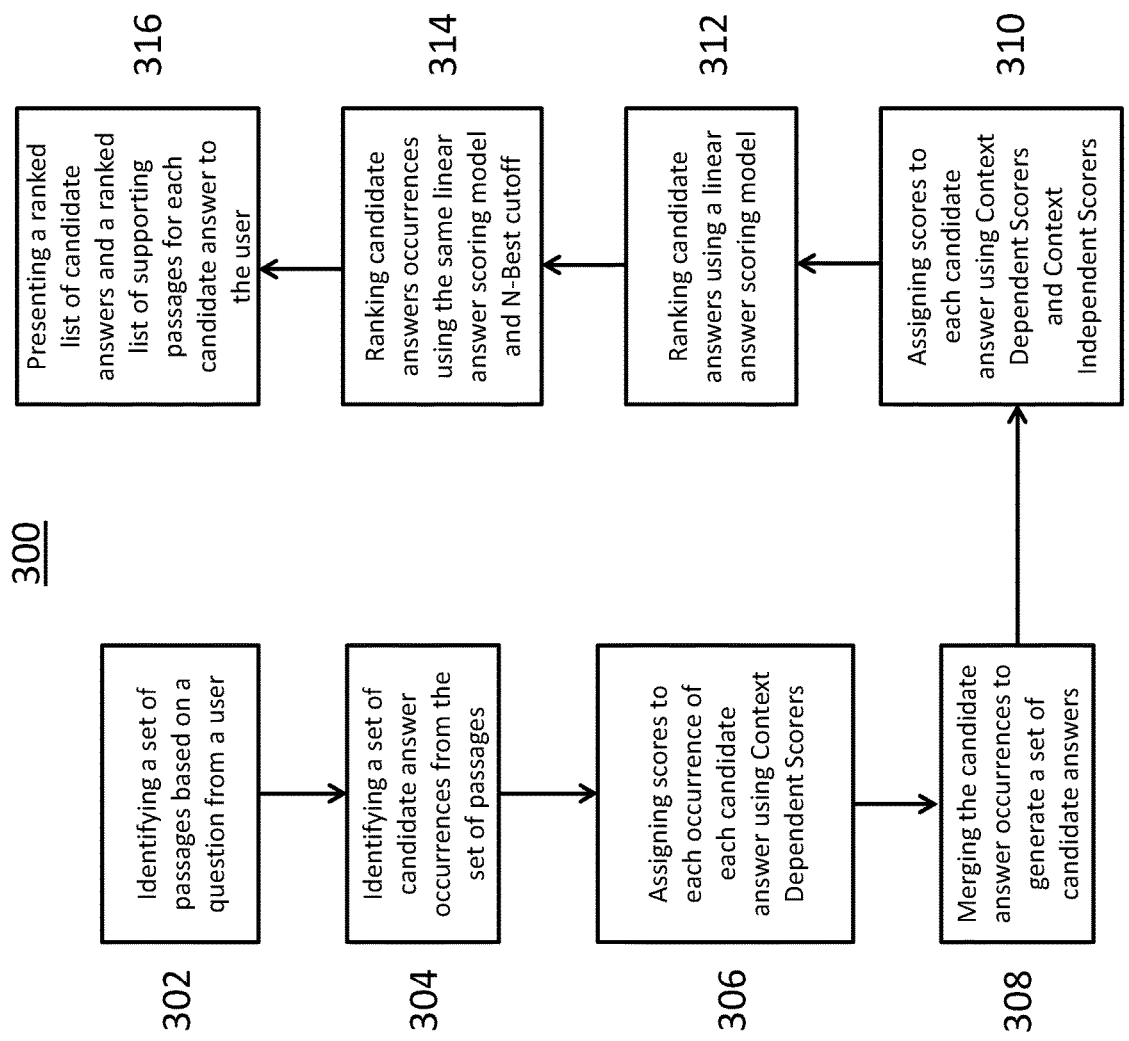
FIG. 3 depicts a flowchart illustrating a method for ranking supporting passages in an order of relevance to a particular candidate answer, according to some embodiments described herein.

FIG. 3 is a flowchart 300 illustrating a method for ranking supporting passages in an order of relevance to a particular candidate answer, according to embodiments herein. At step 302, the QA system 100 identifies a set of supporting passages in response to a question raised by a QA system user. The set of supporting passages related to the question are provided by the QA system 100. At step 304, the QA system 100 identifies a set of candidate answer occurrences from the set of supporting passages. Each supporting passage can have only one candidate answer (e.g., "Barack Obama"), or several candidate answers (e.g., "Barack Obama" and "Joe Biden"). Further, a candidate answer can occur once in a supporting passage, while the same candidate answer can occur more than once in the same supporting passage. At step 306, context dependent scorers assign scores to each occurrence of each candidate answer. These context dependent scores (local features) are used to assess the relevance of supporting passages where a particular candidate answer occurs. The QA system 100 also includes context independent scorers, however, only the scores of context dependent scorers are taken into account at this step. At step 308, the candidate answer occurrences are merged to generate a set of candidate answers. In this set of candidate answers, each candidate answer is different. For example, five occurrences of "Barack Obama" are merged into only one "Barack Obama" to reduce redundancy. At step 310, context dependent scorers and context independent scorers assign scores to each candidate answer. These scores (including local features and nonlocal features) are used to identify the best candidate answer, and both context dependent scorers and context independent scorers contribute to the identification. At step 312, a linear answer scoring model 204 is then used to calculate a final confidence score (from the scores of step 310) for each candidate answer, for example "Barack Obama," "Joe Biden," etc., and rank all the candidate answers based on each final confidence score. Accordingly, a ranked list of candidate answers is obtained, with the candidate answer having the highest final confidence score at the top of the list. At step 314, the same linear answer scoring model 204 is then used to calculate a final confidence score (from the scores of step 306) for each candidate answer occurrence, and rank all the candidate answer occurrences based on each final confidence score. Accordingly, a ranked list of supporting passages where a particular candidate answer occurs is obtained for this particular candidate answer. Each candidate answer has a ranked list of supporting passages. For example, "Barack Obama" has a ranked list of supporting passages, while "Joe Biden" also has another ranked list of supporting passages. The most relevant supporting passage having the highest final confidence score is at the top of the list. The linear answer scoring model 204 can be used to rank candidate answers, as well as supporting passages where each candidate answer occurs. In an embodiment, the N-Best algorithm can be used when ranking the supporting passages. Specifically, only supporting passages having a final confidence score over a predetermined N-best cutoff value are included in the ranked list. At step 316, a ranked list of candidate answers and a ranked list of supporting passages for each candidate answer is presented to the user who raised the question.

Figure 4:
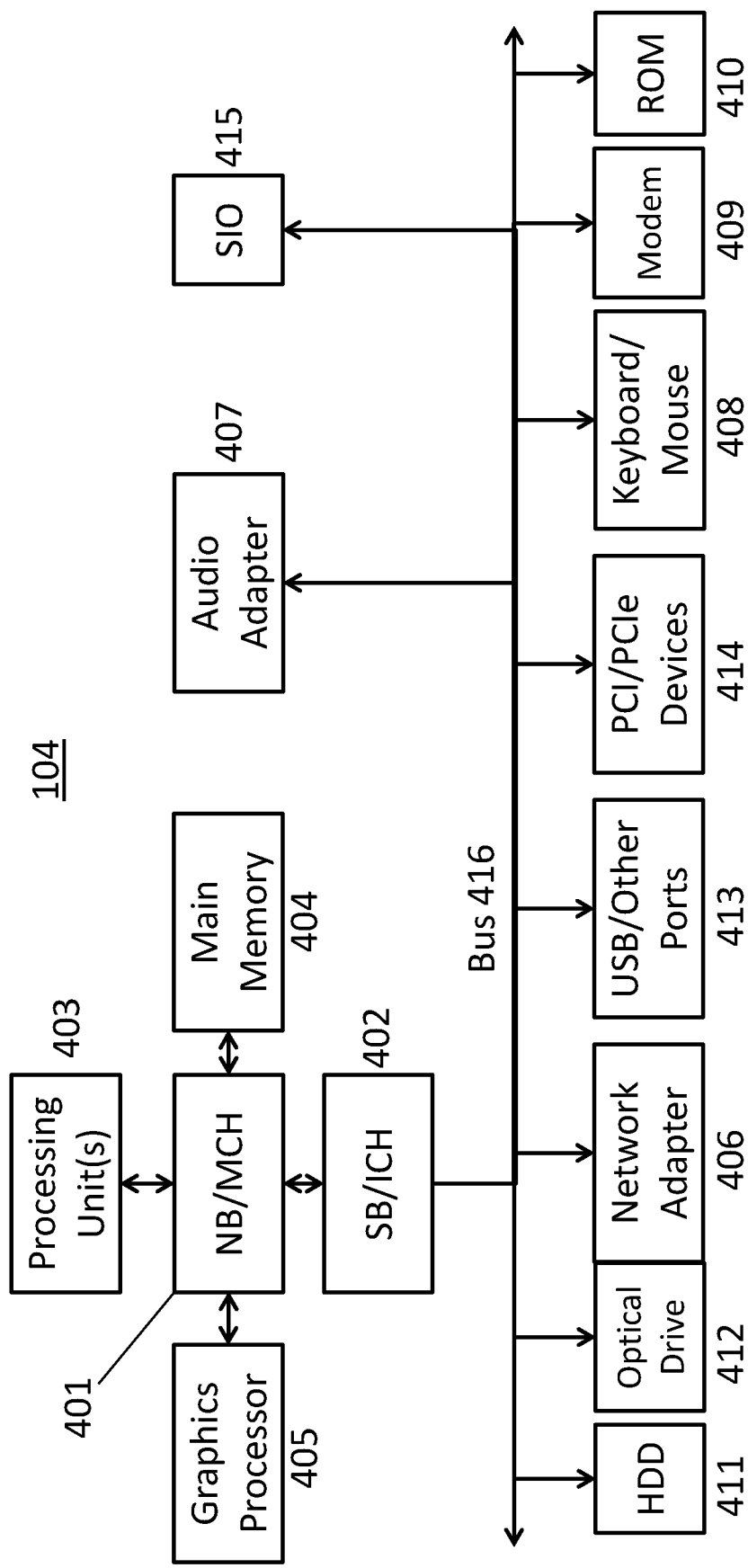
FIG. 4 is a block diagram of another example computer device system in which aspects of the illustrative embodiments may be implemented.

FIG. 4 is a block diagram of an example computer device 104 in which aspects of the illustrative embodiments may be implemented. The computer device 104 is an example of a computer, such as a server or client, in which computer usable code or instructions implementing the process for illustrative embodiments of the present invention are located. In one embodiment, FIG. 4 represents a server computing device, such as a server, which implements QA system 100 and described herein.

In the depicted example, the computer device 104 may employ a hub architecture including a north bridge and memory controller hub (NB/MCH) 401 and south bridge and input/output (I/O) controller hub (SB/ICH) 402. Processing unit 403, main memory 404, and graphics processor 405 may be connected to the NB/MCH 401. Graphics processor 405 may be connected to the NB/MCH 401 through an accelerated graphics port (AGP) (not shown in FIG. 4).

In the depicted example, the network adapter 406 connects to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 may connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 may use an integrated drive electronics (IDE) or serial advanced technology attachment (SATA) interface. The super I/O (SIO) device 415 may be connected to the SB/ICH 402.

An operating system may run on processing unit 403. The operating system could coordinate and provide control of various components within the computer device 104. As a client, the operating system may be a commercially available operating system. An object-oriented programming system, such as the Java™ programming system, may run in conjunction with the operating system and provide calls to the operating system from the object-oriented programs or applications executing on the computer device 104. As a server, the computer device 104 may be an IBM® eServer™ System p® running the Advanced Interactive Executive operating system or the Linux operating system. The computer device 104 may be a symmetric multiprocessor (SMP) system that may include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the generation system may be performed by the processing unit

403 using computer usable program code, which may be located in a memory such as, for example, main memory 404, ROM 410, or in one or more peripheral devices.

A bus system 416 may be comprised of one or more busses. The bus system 416 may be implemented using any type of communication fabric or architecture that may provide for a transfer of data between different components or devices attached to the fabric or architecture. A communication unit such as the modem 409 or network adapter 406 may include one or more devices that may be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the computer device 104 may take the form of a number of different data processing systems, including but not limited to, client computing devices, server computing devices, tablet computers, laptop computers, telephone or other communication devices, personal digital assistants, and the like. Essentially, computer device 104 may be any known or later developed data processing system without architectural limitation.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof. No claim element herein is to be construed under the provisions of 35 U.S.C. 112 (f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method for ranking supporting passages in a question answering (QA) system, wherein the QA system is coupled to a document corpus, and the document corpus includes a plurality of documents related to a particular domain, the method comprising:
   receiving, by a processor coupled to one or more user devices, an input question and a plurality of passages, wherein the plurality of passages are extracted from the document corpus by the QA system;
   identifying, by the processor, a plurality of candidate answer occurrences from the plurality of passages, wherein at least two candidate answer occurrences are the same;
   assigning, by the processor, a plurality of first local features to each candidate answer occurrence, wherein the plurality of first local features are assigned by a plurality of context dependent scorers, and each context dependent scorer assigns one first local feature to the each candidate answer occurrence;
   merging, by the processor, the plurality of candidate answer occurrences to generate a group of candidate answers, wherein each candidate answer is different, wherein the at least two same candidate answer occurrences are merged as one candidate answer;
   assigning, by the processor, a plurality of second local features and a plurality of nonlocal features to each candidate answer;
   calculating a first final confidence score from the plurality of first local features for the each candidate answer occurrence;
   calculating a second final confidence score from the plurality of second local features and the plurality of nonlocal features for the each candidate answer;
   ranking, by the processor, the group of candidate answers using a linear answer scoring model, wherein the group of candidate answers are ranked based on the second final confidence score;
   ranking, by the processor, the plurality of candidate answer occurrences using the linear answer scoring model, wherein the plurality of candidate answer occurrences are ranked based on the first final confidence score; and
   presenting, by the processor, a ranked list of candidate answers and a ranked list of supporting passages for each candidate answer, in response to the input question, wherein the supporting passages correspond to the plurality of candidate answer occurrences.

2. The method as recited in claim 1, wherein the plurality of second local features are assigned by the plurality of context dependent scorers, and each context dependent scorer assigns one second local feature to the each candidate answer; the plurality of nonlocal features are generated from the plurality of second local features.

3. The method as recited in claim 1, wherein an N-Best algorithm is used in ranking the plurality of candidate answer occurrences, wherein the ranked list of supporting passages include at least one supporting passage having the first final confidence score over a predetermined N-best cutoff value.

4. The method as recited in claim 1, wherein the plurality of candidate answer occurrences are ranked in an order of relevance to a particular candidate answer.

5. The method as recited in claim 4, wherein the particular candidate answer occurs more than once in one or more supporting passages.

6. The method as recited in claim 4, wherein at least two different candidate answers occur in a particular supporting passage.

7. The method as recited in claim 1, wherein the plurality of context dependent scorers include a skip-n-gram scorer, a textual-alignment scorer, a bag-of-words scorer, a syntactic feature scorer, a semantic feature scorer, a logical form answer candidate scorer, a logical form pattern matcher answer scorer, a lexical string edit distance scorer, and a character string edit distance scorer.

8. A computer program product for ranking supporting passages in a question answering (QA) system, the computer program product comprising a computer readable storage medium having program instructions embodied therewith, the program instructions executable by a processor to cause the processor to:
   receive an input question and a plurality of passages, wherein the plurality of passages are extracted from a document corpus by the QA system;
   identify a plurality of candidate answer occurrences from the plurality of passages, wherein at least two candidate answer occurrences are the same;
   assign a plurality of first local features to each candidate answer occurrence, wherein the plurality of first local features are assigned by a plurality of context dependent scorers, and each context dependent scorer assigns one first local feature to the each candidate answer occurrence;
   merge the plurality of candidate answer occurrences to generate a group of candidate answers, wherein each candidate answer is different, wherein the at least two same candidate answer occurrences are merged as one candidate answer;
   assign a plurality of second local features and a plurality of nonlocal features to each candidate answer;
   calculate a first final confidence score from the plurality of first local features for the each candidate answer occurrence;
   calculate a second final confidence score from the plurality of second local features and the plurality of nonlocal features for the each candidate answer;
   rank the group of candidate answers using a linear answer scoring model, wherein the croup of candidate answers are ranked based on the second final confidence score;
   rank the plurality of candidate answer occurrences using the linear answer scoring model, wherein the plurality of candidate answer occurrences are ranked based on the first final confidence score; and
   present a ranked list of candidate answers and a ranked list of supporting passages for each candidate answer, in response to the input question, wherein the supporting passages correspond to the plurality of candidate answer occurrences.

9. The computer program product as recited in claim 8, wherein an N-Best algorithm is used in ranking the plurality of candidate answer occurrences, wherein the ranked list of supporting passages include at least one supporting passage having the first final confidence score over a predetermined N-best cutoff value.

10. The computer program product as recited in claim 9, wherein the plurality of candidate answer occurrences are ranked in an order of relevance to a particular candidate answer.

11. The computer program product as recited in claim 10, wherein the particular candidate answer occurs more than once in one or more supporting passages.

12. The computer program product as recited in claim 10, wherein at least two different candidate answers occur in a particular supporting passage.

13. A system for ranking supporting passages in a question answering (QA) system, comprising:
   a processor configured to:
      receive an input question and a plurality of passages, wherein the plurality of passages are extracted from a document corpus by the QA system;
      identify a plurality of candidate answer occurrences from the plurality of passages, wherein at least two candidate answer occurrences are the same;
      assign a plurality of first local features to each candidate answer occurrence, wherein the plurality of first local features are assigned by a plurality of context dependent scorers, and each context dependent scorer assigns one first local feature to the each candidate answer occurrence;
      merge the plurality of candidate answer occurrences to generate a group of candidate answers, wherein each candidate answer is different, wherein the at least two same candidate answer occurrences are merged as one candidate answer;
      assign a plurality of second local features and a plurality of nonlocal features to each candidate answer;
      calculate a first final confidence score from the plurality of first local features for the each candidate answer occurrence;
      calculate a second final confidence score from the plurality of second local features and the plurality of nonlocal features for the each candidate answer;
      rank the group of candidate answers using a linear answer scoring model, wherein the group of candidate answers are ranked based on the second final confidence score;
      rank the plurality of candidate answer occurrences using the linear answer scoring model, wherein the plurality of candidate answer occurrences are ranked based on the first final confidence score; and
      present a ranked list of candidate answers and a ranked list of supporting passages for each candidate answer in response to the input question, wherein the supporting passages correspond to the plurality of candidate answer occurrences.

14. The system as recited in claim 13, wherein the plurality of second local features are assigned by the plurality of context dependent scorers, and each context dependent scorer assigns one second local feature to the each candidate answer; the plurality of nonlocal features are generated from the plurality of second local features.

15. The system as recited in claim 13, wherein an N-Best algorithm is used in ranking the plurality of candidate answer occurrences, wherein the ranked list of supporting passages include at least one supporting passage having the first final confidence score over a predetermined N-best cutoff value.

16. The system as recited in claim 13, wherein the plurality of candidate answer occurrences are ranked in an order of relevance to a particular candidate answer; wherein the particular candidate answer occurs more than once in one or more supporting passages.

* * * * *